(12) United States Patent
Sebest et al.

(10) Patent No.: US 9,544,019 B1
(45) Date of Patent: Jan. 10, 2017

(54) SYSTEMS AND METHODS FOR RIPPLE COMMUNICATION DECODING

(71) Applicant: FREESCALE SEMICONDUCTOR INC., Austin, TX (US)

(72) Inventors: Martin Sebest, Poluvsie (SK); Martin Mienkina, Bystrice Nad Olsi (CZ)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/835,512

(22) Filed: Aug. 25, 2015

(51) Int. Cl.
*H04L 27/00* (2006.01)
*H04B 3/54* (2006.01)
*H04B 1/16* (2006.01)

(52) U.S. Cl.
CPC ............... *H04B 3/546* (2013.01); *H04B 1/16* (2013.01)

(58) Field of Classification Search
CPC .................................. H04B 3/546; H04B 1/16
USPC ...... 375/316, 240.24; 327/553, 348; 329/300
See application file for complete search history.

(56) References Cited

U.S. PATENT DOCUMENTS

| | | | |
|---|---|---|---|
| 3,852,738 A | | 12/1974 | Niederberger et al. |
| 4,065,722 A | * | 12/1977 | Francis ............... H04L 27/0008 329/300 |
| 4,145,716 A | * | 3/1979 | Uemura ............... H04N 7/1713 348/E7.067 |
| 5,463,346 A | * | 10/1995 | Brooks .................. H03H 17/02 327/553 |
| 5,861,922 A | * | 1/1999 | Murashita ............ H04N 9/8047 375/240.24 |
| 6,765,516 B1 | * | 7/2004 | Coley ................ G01R 19/2506 327/348 |
| 2005/0251369 A1 | * | 11/2005 | DeCarlo ............... G01L 23/085 702/190 |
| 2014/0169053 A1 | * | 6/2014 | Ilic .................... H02M 7/53873 363/132 |

FOREIGN PATENT DOCUMENTS

| | | |
|---|---|---|
| CH | 647624 A5 | 1/1985 |
| CN | 10286638 B | 8/2014 |
| EP | 0567494 B1 | 1/1992 |
| NZ | 240265 A | 12/1994 |
| WO | 2014020380 A1 | 2/2014 |

OTHER PUBLICATIONS

Sebest, M., "Ripple Control Receiver Using Kinetis M," Freescale Semiconductor, Inc., Application Note, Document No. AN5046, Nov. 2014.
ORION New Zealand Limited, Ripple Signal Guide, "How to Use Ripple Signals on Orion's Network," Rev 7, Issued Jan. 30, 2014, NW70.26.02.

* cited by examiner

*Primary Examiner* — Daniel Washburn
*Assistant Examiner* — Fitwi Hailegiorgis

(57) ABSTRACT

The embodiments described herein provide devices and methods to facilitate ripple control communication. Specifically, the embodiments provide devices and methods for decoding ripple control data from ripple signals, such as ripple signals that have been superimposed over power signals used to transmit power. These embodiments provide devices and methods that use band-pass filter, signal multiplier, fast and slow low-pass filters, and accumulate a difference between outputs of these slow and fast low-pass filters. This accumulated difference is then used to decode the ripple control data.

11 Claims, 5 Drawing Sheets

SYSTEMS AND METHODS FOR RIPPLE COMMUNICATION DECODING

TECHNICAL FIELD

Embodiments described herein relate generally to ripple communication, and more specifically relate to decoding ripple data.

BACKGROUND

Ripple control communication is based on superimposing a higher frequency signal, commonly called a ripple signal, onto a lower frequency power signal. For example, ripple control communication is commonly used to transmit data over power lines that are otherwise used to deliver power to homes and businesses. In such a system, the power signals transmitted over the power lines typically have a frequency of 50 Hz or 60 Hz. Ripple control communication can be implemented by superimposing ripple signals having a frequency between 150 Hz and 1600 Hz on these power signals. In a typical implementation the ripple signals would also have significantly smaller amplitude compared to the power signals.

So implemented, ripple control communication can provide a variety of functions. For example, ripple control communication can be implemented to provide communication to and from electric meters used to monitor power usage. In such an implementation the ripple control communication can be used to deliver time of use information, thus facilitating the application of different rates to different times of use. As another example, the ripple control communication can be used to communicate to certain appliances. In this application the communication to appliances can be used to selectively turn on or off the appliances. For example, appliances such as electric water heaters can be selectively turned on and off using ripple control communication as a way for electric utilities to provide load balancing on the power deliver network.

One issue with ripple control communication is the receiving and decoding of data from the superimposed ripple signals. For example, because of the varying distances typically involved, the amplitude of the ripple signals received can vary greatly. Additionally, the frequency of the superimposed ripple signal can periodically vary or otherwise can change over time. Such changes in amplitude can result in the need to periodically recalibrate the ripple control receivers. For example, previous techniques for receiving and decoding data from ripple signals have used static thresholds that require significant calibration. Unfortunately, such calibration may be time consuming and difficult to reliably achieve without input from the user, and thus can lead to reduced data transmission reliability. Thus, what is needed is improved techniques for decoding of data from ripple signals with reduced requirements for calibration and user input.

DETAILED DESCRIPTION

The embodiments described herein provide devices and methods to facilitate ripple control communication. Specifically, the embodiments provide devices and methods for decoding ripple control data from ripple signals, such as ripple signals that have been superimposed over power signals used to transmit power. These embodiments provide devices and methods that use fast and slow filters, and accumulate a difference between outputs of these fast and slow filters. This accumulated difference is then used to decode the ripple control data. Notably, such an implementation provides the decoding of ripple control data without requiring the use of specific thresholds that must repeatedly be calibrated. Thus, such a device and method can be used to reliably decode ripple control data from ripple signals of varying amplitudes and frequencies, and can thus be used to decode ripple control data that has been transmitted over wide ranges of times and distances, all without requiring repeated calibration.

Figure 1:
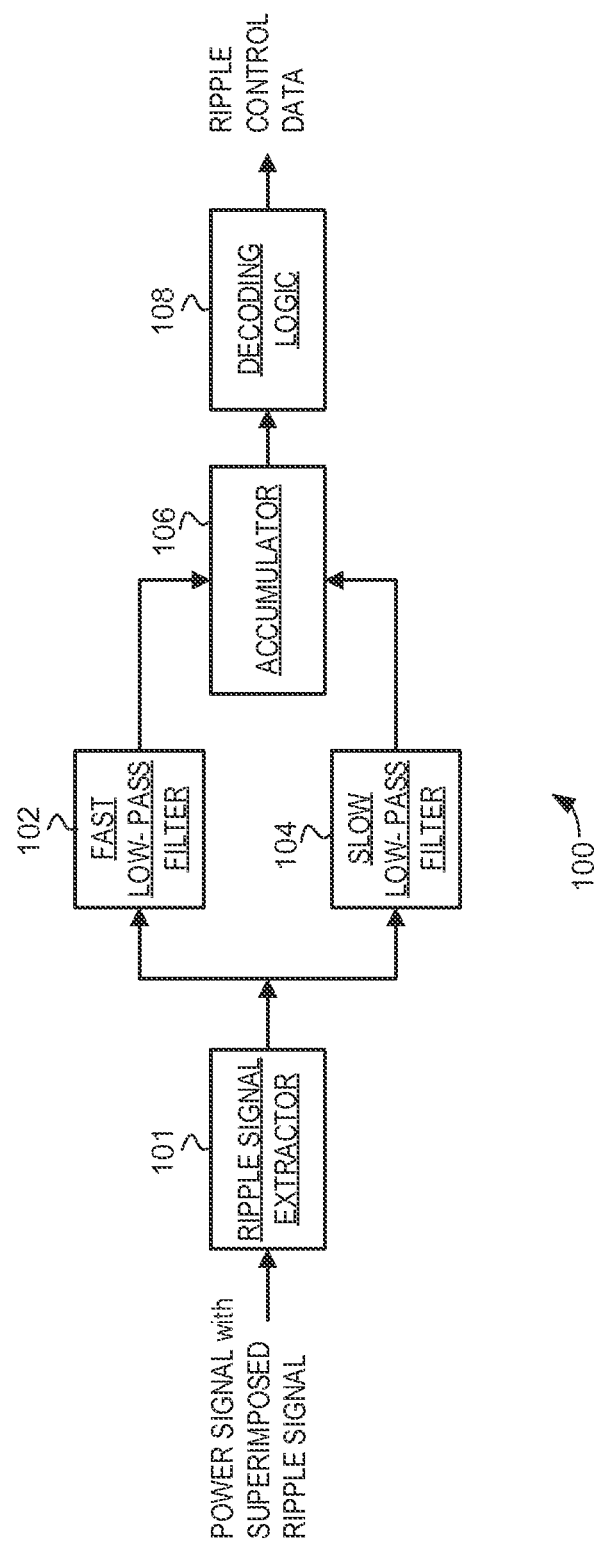
FIG. 1 is a schematic diagram of a ripple control receiver in accordance with an exemplary embodiment.

Turning now to FIG. 1, an exemplary ripple control receiver 100 is illustrated schematically. It should be noted that FIG. 1 is a simplified representation, and that typical implementation would include more elements and connections. The ripple control receiver 100 includes a ripple signal extractor 101, a fast low-pass filter 102, a slow low-pass filter 104, an accumulator 106 and decoding logic 108. In general, the ripple control receiver 100 is configured to receive a power signal with a superimposed ripple signal and to output ripple control data. The ripple signal extractor 101 is configured to extract the superimposed ripple signal from the power signal, and pass the extracted ripple signal to both the fast low-pass filter 102 and the slow low-pass filter 104.

Specifically, the fast low-pass filter 102 has an input configured to receive the extracted ripple signal, and outputs a first filtered ripple signal. The slow low-pass filter 104 likewise has an input configured to receive the extracted ripple signal, and outputs a second filtered ripple signal. In general, the fast low-pass filter 102 and slow low-pass filter 104 have different frequency responses, e.g., different cutoff frequencies. The difference in the frequency response of the two filters is reflected in the first filtered ripple signal and the second filtered ripple signal. The accumulator 106 is configured to accumulate a difference between the first filtered ripple signal and the second filtered ripple signal and generate an accumulated value in response to the accumulated difference. The decoding logic 108 is configured to receive the accumulated value and decode ripple control data from the accumulated value.

It should be noted that this use of the fast low-pass filter 102, the slow low-pass filter 104, and the accumulator 106, eliminates the need for repeated calibration of threshold values. This facilitates the decoding of ripple control data from ripple signals having widely varying amplitudes. Furthermore, with the ability to reliably decode ripple control data from signals of varying amplitude, the ripple control receiver 100 can facilitate ripple based communication over a wide range of distances.

It should also be noted that the ripple control receiver 100 can be implemented with a variety of different technologies. For example, in some implementations the ripple control receiver 100 can be fully implemented with digital components. In such an implementation, the various filters and other elements could be embedded into an appropriately configured digital microcontroller. In other embodiments, the ripple control receiver 100 can be implemented with a combination of analog and digital elements. Such an implementation can use discrete elements, or any suitable combination of discrete and embedded components.

As noted above, the decoding logic 108 is configured to receive the accumulated value and decode ripple control data from the accumulated value. This can be accomplished by asserting a ripple control data signal in response to the accumulated value being above a threshold, and de-asserting the ripple control data in response to the accumulated value being below the threshold. Stated another way, the decoding can be performed by generating a logic high when the accumulated value is above a threshold, and generating a logic low when the accumulated value is below a threshold. It should be noted that in these examples the thresholds used to decode the ripple control data can be static thresholds that are not required to be repeatedly calibrated. Instead, in a typical embodiment these thresholds can be set once and still reliably decode ripple signals having a wide range of amplitudes.

Figure 2:
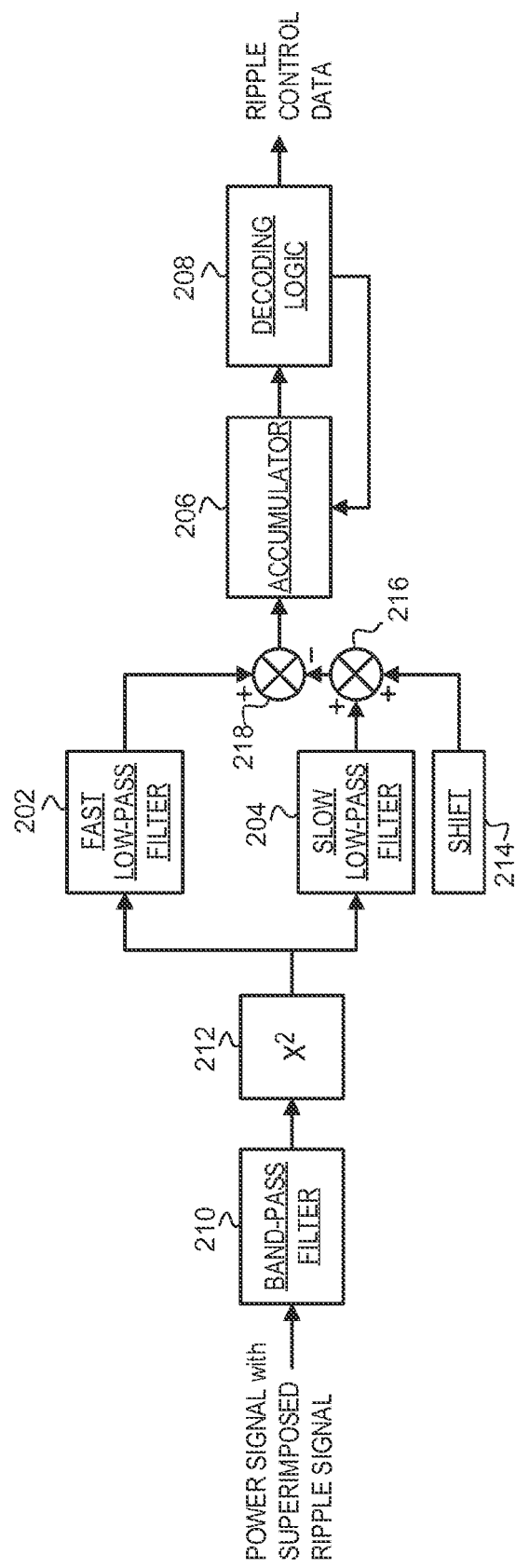
FIG. 2 is a schematic diagram of a ripple control receiver in accordance with another exemplary embodiment.

Turning now to FIG. 2, another embodiment of an exemplary ripple control receiver 200 is illustrated schematically. The ripple control receiver 200 includes a fast low-pass filter 202, a slow low-pass filter 204, an accumulator 206, a decoding logic 208, a band-pass filter 210, a signal-squaring element 212, a signal-level shifter 214, a first summer 216 and a second summer 218. In general, the ripple control receiver 200 receives a power signal having a superimposed ripple communication signal, and decodes ripple control data from that received power signal.

The band-pass filter 210 is configured to receive the power signal having the superimposed ripple communication signal. The band-pass filter 210 filters away low and high frequency signals, passing only signals in a middle range frequency. As such, the band-pass filter 210 blocks the underlying power signal while allowing the superimposed ripple signal to pass to the signal-squaring element 212. In general, the signal-squaring element 212 multiplies the received signal by itself, effectively rectifying the received signal and introducing a DC component.

In general, the band-pass filter 210 and the signal-squaring element 212 operate together to extract and amplify the ripple signal from the power signal. That extracted ripple signal is then provided to both the fast low-pass filter 202 and the slow low-pass filter 204, with those low-pass filters respectively outputting signals that comprise a relatively fast and a relatively slow varying mean square of the ripple signal.

Specifically, the output of the signal-squaring element 212 is coupled to the inputs of both the fast low-pass filter 202 and the slow low-pass filter 204. In accordance with the embodiments described herein, the fast low-pass filter 202 and the slow low-pass filter 204 have different frequency responses. Specifically, the fast low-pass filter 202 has higher cut-off frequency compared to the slow low-pass filter 204. In this arrangement, the output of the fast low-pass filter 202 comprises a first filtered extracted signal and the output of the slow low-pass filter 204 comprises a second filtered extracted signal. In this embodiment, the first filtered ripple signal is a fast varying mean square of the ripple signal. Likewise, the second filtered ripple signal is a slow varying mean square of the ripple signal. It should be noted that in this context "fast" and "slow" are relative terms, and that the fast varying mean square of the ripple signal thus varies fast compared to the slow varying mean square of the ripple signal.

The second filtered ripple signal is passed to an input of the first summer 216. The signal-level shifter 214 and first summer 216 are configured to provide an amplitude shift to the second filtered ripple signal. Specifically, the signal-level shifter 214 provides a constant value, and the first summer 216 is configured to sum that constant value with the second filtered ripple signal. This amplitude shift of the second filtered ripple signal is implemented to ensure that the second filtered ripple signal is above the first filtered ripple signal during the idle state, and thus create the correct logical state for zero detection in the idle state. In a typical implementation this shift can be a relatively small constant value shift.

The first filtered ripple signal from the fast low-pass filter 202 is passed to an input of the second summer 218. The output of the first summer 216 is coupled with another input of the second summer 218. So connected, the second summer 218 is configured to generate a difference signal proportional to the difference between the first filtered ripple signal and the amplitude-shifted second filtered ripple signal.

This difference signal is applied to the input of the accumulator 206. The accumulator 206 is configured to accumulate a difference between the first filtered ripple signal and the second filtered ripple signal and generate an accumulated value in response to the accumulated difference. This accumulated value is applied to the input of the decoding logic 208. The decoding logic 208 is configured to receive the accumulated value and decode ripple control data from the accumulated value. Additionally, in this illustrated embodiment the decoding logic 208 is configured to periodically reset the accumulator 206.

It should again be noted that this embodiment of the ripple control receiver 200 can eliminate the need for repeatedly calibrating threshold values used to decode the ripple control data. Specifically, the configuration of the ripple control receiver 200 that facilitates the accumulation of difference values, where the difference values correspond to the difference between the first filtered ripple signal and a amplitude-shifted second filtered ripple signal, and the decoding of ripple control data from those accumulated values, can eliminate the need for repeatedly calibrating threshold values.

The various elements in ripple control receiver 200 can be implemented with a variety of different technologies, including analog and digital components, discrete and integrated components, and any combination thereof. In one embodiment the entire ripple control receiver 200 is implemented together in one appropriately configured processor or microcontroller. In other embodiments, the individual elements of the ripple control receiver 200 can be implemented as separate devices, with discrete elements and/or combinations of integrated devices.

For example, the band-pass filter 210 can be implemented using any suitable digital or analog filter technology. For example, a digital band-pass filter 210 can be implemented on a processor configured to perform an analog-to-digital conversion of the input signal and further perform the mathematical operations corresponding to a band-pass filter on the converted input signals.

The band-pass filter 210 would typically be implemented with upper and lower cut-off frequencies selected to pass the frequency of the ripple signal and attenuate others. For example, the upper cut-off frequency can be set to about 1.05 times the ripple frequency [Hz] while the lower cut-off frequency can be set to about 0.95 times the ripple frequency [Hz].

The signal-squaring element 212 can likewise be implemented with any suitable digital or analog technology. For example, the signal-squaring element 212 can be implemented using multiply instructions on the processor core, with inputs and outputs of the signal-squaring element 212 stored in either memory or registers.

The fast low-pass filter 202 and slow low-pass filter 204 can likewise be implemented with any suitable digital or analog technology. For example, the fast low-pass filter 202 and slow low-pass filter 204 can be implemented on a processor configured to perform the mathematical operations corresponding to low-pass filters. As was described above, the fast low-pass filter 202 and slow low-pass filter 204 are implemented to have different frequency responses, with the fast low-pass filter 202 having a higher cut-off frequency compared to the slow low-pass filter 204. In general, this different frequency response is selected to obtain faster and slower filter response to input change. For example, the fast low-pass filter 202 can have a cut-off frequency of between about 4 and 8 Hz and the slow low-pass filter 204 can have a cut-off frequency of between about 1 and 3 Hz. In such an embodiment the relatively low cut-off frequency serves to extract the DC signal.

The first summer 216 and second summer 218 can be implemented with any suitable summation devices. For example, they can be implemented with an appropriate summing amplifier circuit configured to add voltages applied to the input. Furthermore, because the second summer 218 determines the difference, the second summer 218 can be implemented with an appropriate differential amplifier circuit. Alternatively, the first summer 216 and second summer 218 can be implemented digitally with an appropriately configured digital processor.

The signal-level shifter 214 can be implemented with any suitable element that provides a level shift to the second filtered ripple signal. For example, a controllable voltage generator can be used to provide a specific voltage shift to the second filtered ripple signal. Alternatively, the signal-level shifter 214 can be implemented digitally to add a constant value to the second filtered ripple signal.

The accumulator 206 can be implemented with an appropriately configured digital processor. For example, the accumulator 206 can be implemented with a special or a general purpose register on a processor that is configured to accumulate values. Alternatively, the accumulator 206 can accumulate values stored in general purpose memory.

The decoding logic 208 can be implemented with an appropriately configured digital processor. In such an embodiment the decoding logic 208 could be implemented to assert a ripple control data signal in response to the accumulated value being above a threshold, and de-assert the ripple control data in response to the accumulated value being below a threshold. Stated another way, the decoding logic 208 can be implemented to generate a logic high when the accumulated value is above a threshold, and generate a logic low when the accumulated value is below a threshold.

Figure 3:
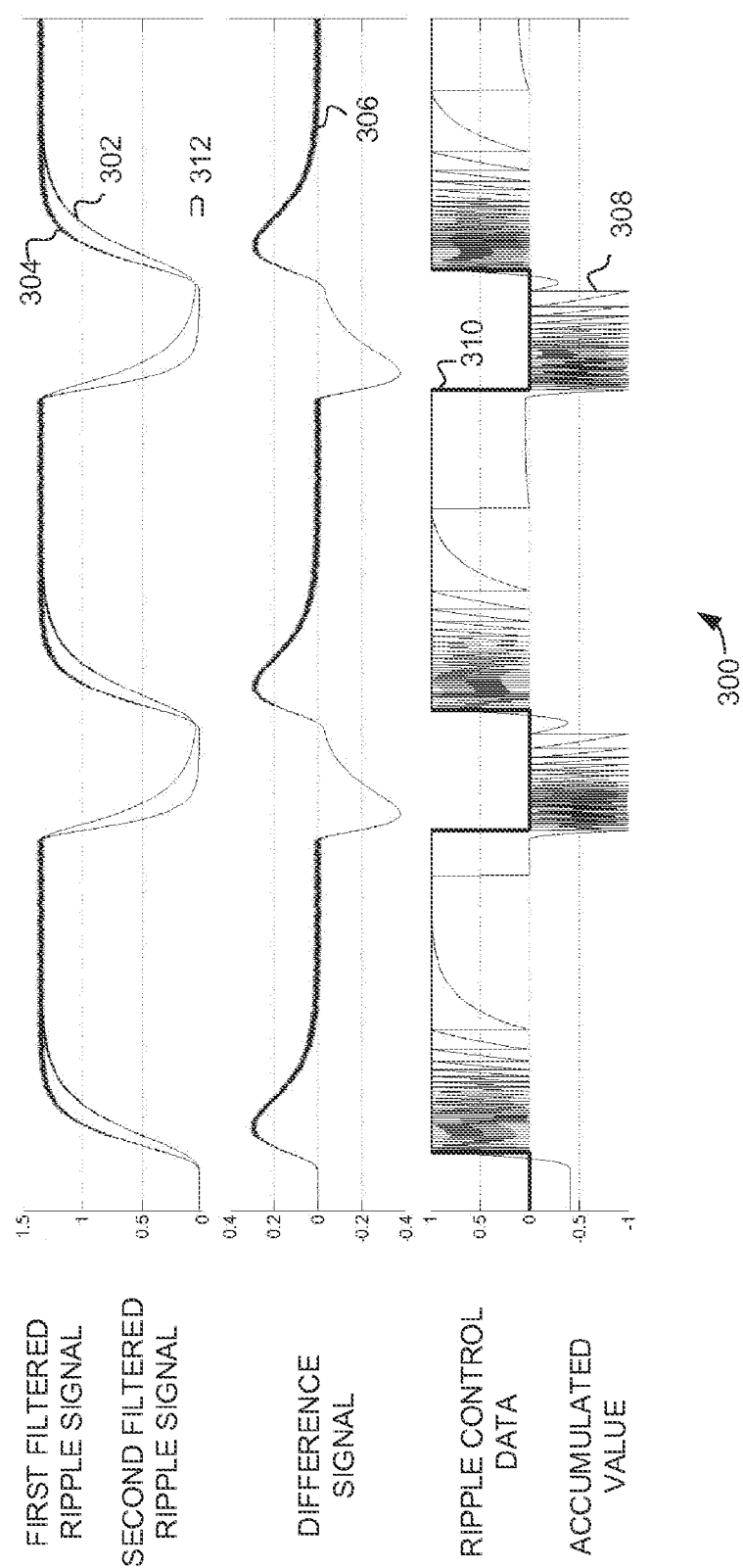
FIG. 3 is a graphical representation of signals in a ripple control receiver in accordance with an exemplary embodiment.

Turning now to FIG. 3, a graphical representation 300 of signals in a ripple control receiver (e.g., ripple control receiver 200) is illustrated. Specifically, the graphical representation 300 includes a first filtered ripple signal 302, a second filtered ripple signal 304, a difference signal 306, an accumulated value 308, and ripple control data 310.

The first filtered ripple signal 302 and the second filtered ripple signal 304 represent signals received at a ripple control receiver for ripple based communication. Thus, the first filtered ripple signal 302 and the second filtered ripple signal 304 represent signals that have been received, filtered, squared, and passed through a fast low pass filter (e.g., fast low-pass filter 202) or through a slow low-pass filter (e.g., slow low-pass filter 204). As shown in FIG. 3, the difference in frequency response between the fast low-pass filter and the slow low pass-filter results in a slight phase shift between the first filtered ripple signal 302 and the second filtered ripple signal 304. Additionally, the example shown in FIG. 3 illustrates an implementation where the second filtered ripple signal 304 has been voltage shifted by an amount 312. As described above, this shift of the second filtered ripple signal 302 is implemented to create the correct logical state for zero detection in the idle state.

The difference signal 306 represents the difference between the first filtered ripple signal 302 and the second filtered ripple signal 304. As such, the difference signal 306 represents the error between the two signals. As described above, such a difference signal 306 can be generated using one or more summers (e.g., summers 216 and 218) that are configured to generate the difference between two received signals.

The accumulated value 308 represents the accumulation of the difference signal 306. Thus, the accumulated value 308 represents the accumulated difference between the first filtered ripple signal and the second filtered ripple signal. The ripple control data 310 represents data that is decoded from the accumulated value 308. Thus, the ripple control data 310 represents an example of data sent over power lines by superimposing a ripple signal over a power signal, and receiving that power signal at a ripple control receiver. In this illustrated example, the ripple control data is decoded from the accumulated value 308 by asserting the ripple control data 310 when the accumulated value 308 is above a threshold ("0", in this illustrated example) and by de-asserting the ripple control data 310 when the ripple control data 310 is below this threshold. Thus, in this illustrated example, the ripple control data 310 is driven to a logic high ("1") when the accumulated value is above the threshold of "0", and is driven to a logic low ("0") when the accumulated value is below the threshold of "0". This process continues as the power signal is received, thus generating a stream of ripple control data 310.

Figure 4:
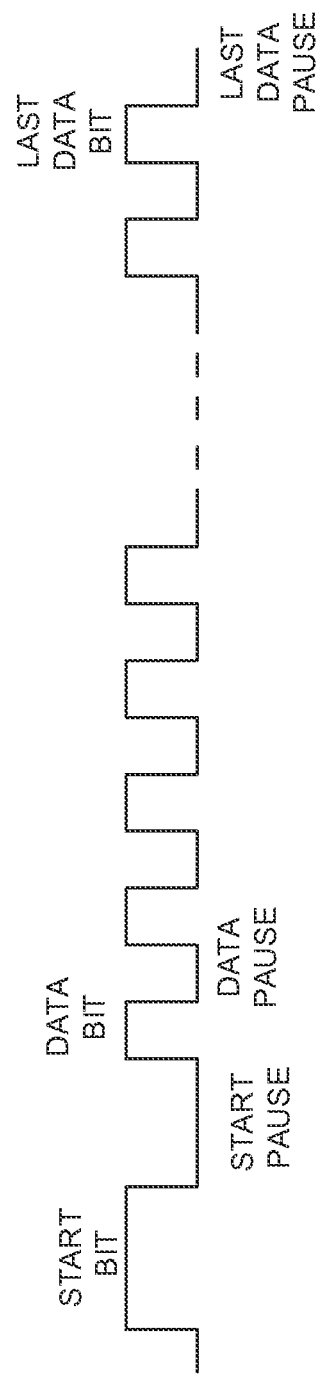
FIG. 4 is a graphical representation of a ripple data stream in accordance with an exemplary embodiment.

Turning now to FIG. 4, a graphical representation of exemplary ripple control data 400 is illustrated. The ripple control data 400 illustrates a stream of data corresponding to an exemplary ripple control communication protocol. Thus, the ripple control data is exemplary of a stream of data that can be decoded using the ripple control receivers and techniques described above. In this example, the ripple control data 400 begins with a start bit followed by a start pause. The start bit and start pause are then followed by the data bits. After each data bit there is a data pause. A typical ripple control communication protocol will include between 30-50 bits separated by data pauses, but other embodiments are also possible. It should be noted that in this example the start bits and start pauses are approximately twice the width of data bits and data pauses, although again this is not required in all protocols. It should also be noted that the pulse widths of the various pulses can vary with application.

A variety of commercially known protocols can be used when sending the ripple control data 400. For example, protocols by the name of Ricontic, Semagyr50, Pulsadis, and Telenerg29 are commonly used in ripple communication.

Figure 5:
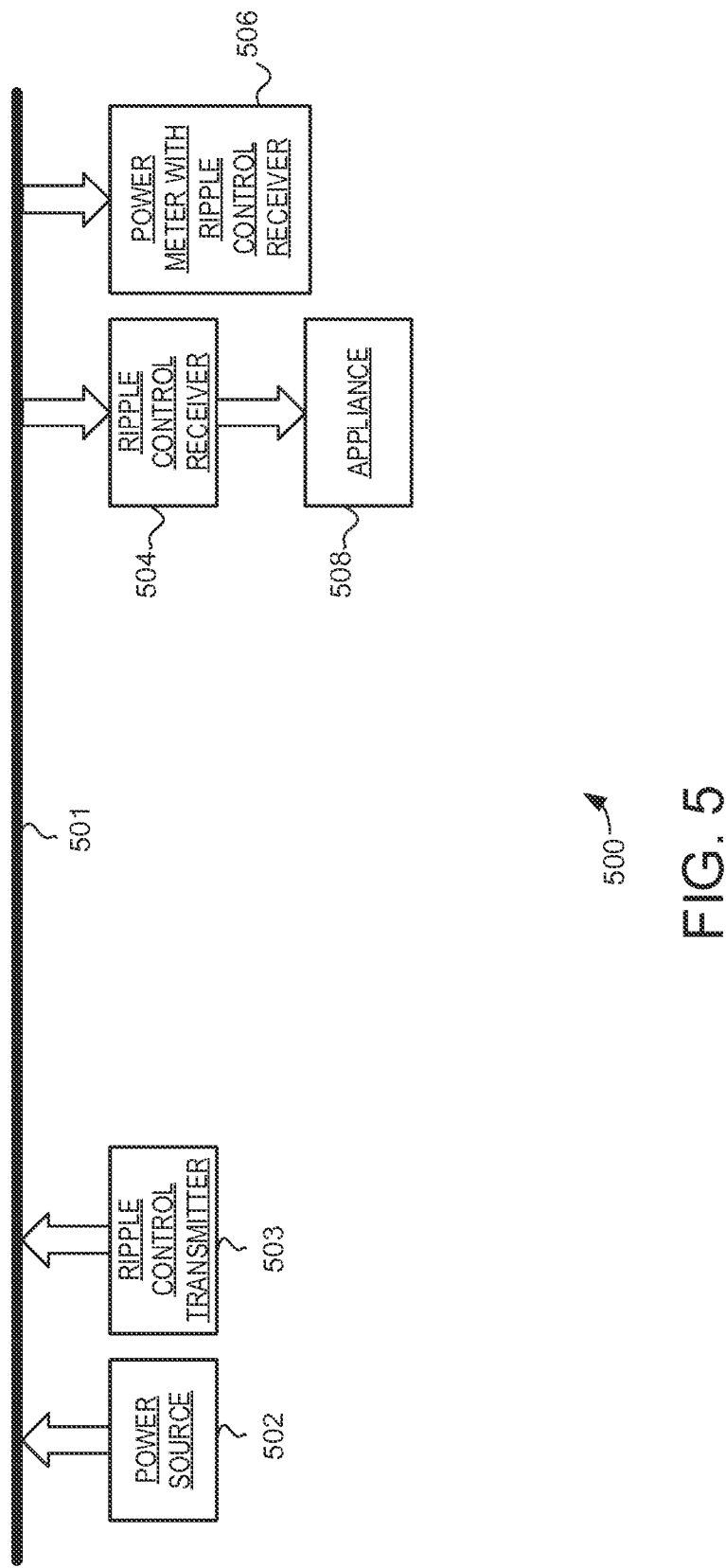
FIG. 5 is a schematic diagram of a power distribution system in accordance with an exemplary embodiment.

Turning now to FIG. 5, a schematic diagram of a power distribution system 500 in accordance with an exemplary embodiment is illustrated. It should be noted that the power distribution system 500 is a greatly simplified example, as a typical system would include many more devices and would facilitate communication between such devices. The power distribution system 500 includes an electrical grid 501, a power source 502, a ripple control transmitter 503, a ripple control receiver 504, a power meter with ripple control receiver 506 and an appliance 508. The power source 502 provides power to the electrical grid 501, and would typically comprise power plants and other elements that provide controlled electrical power. The power is distributed over the electrical grid 501 to various consumers of electricity. To facilitate communication over the electrical grid, a ripple control transmitter 503 is provided. The ripple control transmitter 503 superimposes a ripple signal onto the power signal, and that ripple signal is transmitted with the power signal over the electrical grid 501. Ripple control receivers (e.g., ripple control receiver 504, the ripple control receiver in power meter 506) are provided to receive the power signal and decode the ripple control data from the superimposed ripple signal.

In the illustrated embodiment, the ripple control receiver 504 is coupled to the electrical grid 501 and to the appliance 508. The appliance 508 can be any appliance for which communication is desired, such as an electric water heater. In such a configuration, the ripple control receiver 504 can facilitate communication to the appliance 508. For example, the ripple control receiver 504 can be used to selectively turn on and off the appliance 508 as directed by the ripple control transmitter 503. For example, the appliance 508 can be turned off during peak electrical usage. As another example, turning on and off the appliance 508 can be used for load balancing. In either event, the ripple control transmitter 503 and the ripple control receiver 504 facilitate communication to the appliance 508.

The power meter 506 includes a ripple control receiver. In this case, the ripple control receiver facilitates communication with the power meter 506. For example, the ripple control receiver can be used to change the electrical rates being applied by the power meter 506, and allows the power meter 506 to correctly calculate the price of electricity being consumed. For example, to apply different rates at different times of the day.

Again, the power distribution system 500 is a simplified example of how ripple communication can be used to facilitate communication of power distribution networks.

In one embodiment, a ripple control receiver is provided, the ripple control receiver including: a ripple signal extractor configured to receive a power signal having a superimposed ripple signal and extract the ripple signal from the power signal; a fast low-pass filter configured to receive the extracted ripple signal and generate a first filtered ripple signal; a slow low-pass filter configured to receive the extracted ripple signal and generate a second filtered ripple signal; an accumulator configured to accumulate a difference between the first filtered ripple signal and the second filtered ripple signal and generate an accumulated value in response to the accumulated difference; and decoding logic configured to receive the accumulated value and decode ripple control data from the accumulated value. In such an embodiment, the first filtered ripple signal can comprise a relatively fast varying mean square of the ripple signal and the second filtered ripple signal can comprise a relatively slow varying mean square of the ripple signal.

In another embodiment, a ripple control receiver is provided that includes: a band-pass filter having an input and an output, the band-pass filter input configured to receive a power signal having a superimposed ripple communication signal; a signal-squaring element having an input and an output, the signal-squaring filter input coupled to the band-pass filter output; a fast low-pass filter having an input and an output, the fast low-pass filter input coupled to the signal-squaring filter output and configured to output a first filtered ripple signal, the first filtered ripple signal comprising a relatively fast varying mean square of the ripple signal; a slow low-pass filter having an input and an output, the slow low-pass filter input coupled to the signal-squaring filter output and configured to output a second filtered ripple signal, the second filtered ripple signal comprising a relatively slow varying mean square of the ripple signal; a signal-level shifter having an output; a first summer having a first input, a second input, and an output, the first input coupled to the slow low-pass filter output, and the second input coupled to the signal-level shifter output; a second summer having a first input, a second input, and an output, the first input coupled to the fast low-pass filter output, and the second input coupled to the first summer output; an accumulator having an input and an output, the accumulator input coupled to second summer output, the accumulator configured to accumulate a difference between the first filtered ripple signal and the second filtered ripple signal and generate an accumulated value in response to the accumulated difference; and decoding logic having an input and an output, the decoding logic input coupled to the accumulator output, the decoding logic output configured to receive the accumulated value and decode ripple control data from the accumulated value.

In another embodiment, a method is provided that includes: extracting a ripple signal from a power signal; filtering the extracted ripple signal with a fast low-pass filter to generate a first filtered ripple signal; filtering the extracted ripple signal with a slow low-pass filter to generate a second filtered ripple signal; accumulating a difference between the first filtered ripple signal and the second filtered ripple signal to generate an accumulated value; and decoding ripple control data corresponding to the ripple signal from the accumulated value.

For the sake of brevity, conventional techniques related to communication may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. It should be understood that devices described herein may be implemented either in silicon or another semiconductor material or alternatively by software code representation thereof.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter. In addition, certain terminology may also be used in the foregoing description for the purpose of reference only, and thus are not intended to be limiting.

The terms "first," "second," "third," "fourth" and the like in the description and the claims are used for distinguishing between elements and not necessarily for describing a particular structural, sequential or chronological order. It is to be understood that the terms so used are interchangeable under appropriate circumstances. Furthermore, the terms "comprise," "include," "have" and any variations thereof, are intended to cover non-exclusive inclusions, such that a circuit, process, method, article, or apparatus that comprises a list of elements is not necessarily limited to those elements, but may include other elements not expressly listed or inherent to such circuit, process, method, article, or apparatus.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A ripple control receiver, comprising:
    a ripple signal extractor configured to receive a power signal having a superimposed ripple signal and extract the ripple signal from the power signal, wherein the ripple signal extractor comprises
        a band-pass filter having an input and an output, the band-pass filter configured to receive the power signal having the superimposed ripple communication signal, and
        a signal-squaring element having an input and an output, the signal-squaring element input coupled to the band-pass filter output, the signal-squaring element output coupled to a fast low-pass filter and a slow low-pass filter;
    the fast low-pass filter configured to receive the extracted ripple signal and generate a first filtered ripple signal;
    the slow low-pass filter configured to receive the extracted ripple signal and generate a second filtered ripple signal;
    an accumulator configured to accumulate a difference between the first filtered ripple signal and the second filtered ripple signal and generate an accumulated value in response to the accumulated difference; and
    decoding logic configured to receive the accumulated value and decode ripple control data from the accumulated value.

2. The ripple control receiver of claim 1, wherein the first filtered ripple signal comprises a relatively fast varying mean square of the ripple signal and wherein the second filtered ripple signal comprises a relatively slow varying mean square of the ripple signal.

3. The ripple control receiver of claim 1, wherein the decoding logic is configured receive the accumulated value and decode ripple control data from the accumulated value by virtue of being configured to
    assert a ripple control data signal in response to the accumulated value being above a threshold; and
    de-assert the ripple control data in response to the accumulated value being below the threshold.

4. The ripple control receiver of claim 1, wherein the decoding logic is configured receive the accumulated value and decode ripple control data from the accumulated value by virtue of being configured to
    generate a logic high when the accumulated value is above a threshold; and
    generate a logic low when the accumulated value is below the threshold.

5. The ripple control receiver of claim 1, wherein the decoding logic is further configured to reset the accumulator in response to the accumulated value rising above an upper limit or dropping below a lower limit.

6. The ripple control receiver of claim 1, further comprising:
    a signal-level shifter configured to apply an amplitude shift the second filtered ripple signal.

7. The ripple control receiver of claim 1, wherein the ripple control receiver is implemented with a power meter to facilitate communication with the power meter.

8. The ripple control receiver of claim 1, wherein the ripple control receiver is coupled to an appliance to facilitate communication with the appliance.

9. A ripple control receiver, comprising:
    a band-pass filter having an input and an output, the band-pass filter input configured to receive a power signal having a superimposed ripple communication signal;
    a signal-squaring element having an input and an output, the signal-squaring filter input coupled to the band-pass filter output;
    a fast low-pass filter having an input and an output, the fast low-pass filter input coupled to the signal-squaring filter output and configured to output a first filtered ripple signal, the first filtered ripple signal comprising a relatively fast varying mean square of the ripple signal;
    a slow low-pass filter having an input and an output, the slow low-pass filter input coupled to the signal-squaring filter output and configured to output a second filtered ripple signal, the second filtered ripple signal comprising a relatively slow varying mean square of the ripple signal;
    a signal-level shifter having an output;
    a first summer having a first input, a second input, and an output, the first input coupled to the slow low-pass filter output, and the second input coupled to the signal-level shifter output;
    a second summer having a first input, a second input, and an output, the first input coupled to the fast low-pass filter output, and the second input coupled to the first summer output;
    an accumulator having an input and an output, the accumulator input coupled to second summer output, the accumulator configured to accumulate a difference between the first filtered ripple signal and the second filtered ripple signal and generate an accumulated value in response to the accumulated difference; and
    decoding logic having an input and an output, the decoding logic input coupled to the accumulator output, the decoding logic output configured to receive the accumulated value and decode ripple control data from the accumulated value.

10. The ripple control receiver of claim 9, wherein the ripple control receiver is implemented with a power meter to facilitate communication with the power meter.

11. The ripple control receiver of claim 9, wherein the ripple control receiver is coupled to an appliance to facilitate communication with the appliance.

* * * * *